United States Patent
Kuroyanagi

(10) Patent No.: US 7,610,353 B2
(45) Date of Patent: Oct. 27, 2009

(54) IMAGE FORMING APPARATUS, SETUP METHOD THEREFOR AND PROGRAM FOR IMPLEMENTING THE METHOD

(75) Inventor: Satoshi Kuroyanagi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 712 days.

(21) Appl. No.: 11/115,603

(22) Filed: Apr. 27, 2005

(65) Prior Publication Data

US 2005/0248807 A1    Nov. 10, 2005

(30) Foreign Application Priority Data

Apr. 27, 2004    (JP) ............................. 2004-131836

(51) Int. Cl.
*G06F 15/173* (2006.01)
(52) U.S. Cl. .................................... 709/217
(58) Field of Classification Search .................. 709/217
See application file for complete search history.

(56) References Cited

U.S. PATENT DOCUMENTS

| | | | | |
|---|---|---|---|---|
| 3,048,381 | A | * | 8/1962 | Corson ........................ 432/100 |
| 4,583,365 | A | * | 4/1986 | John ............................. 60/531 |
| 5,187,374 | A | * | 2/1993 | Rogers et al. .......... 250/559.37 |
| 5,214,271 | A | * | 5/1993 | Rogers et al. ................ 250/205 |
| 5,832,301 | A | * | 11/1998 | Yamaguchi .................. 710/48 |
| 6,000,868 | A | * | 12/1999 | Watanabe et al. ........... 400/208 |
| 6,112,256 | A | * | 8/2000 | Goffinet et al. ................. 710/8 |
| 6,674,650 | B1 | * | 1/2004 | Davis et al. .................. 361/796 |
| 6,945,640 | B2 | * | 9/2005 | Cheok .......................... 347/85 |
| 6,975,419 | B2 | * | 12/2005 | Staas et al. ................. 358/1.15 |
| 7,165,109 | B2 | * | 1/2007 | Chiloyan et al. ............ 709/227 |
| 7,168,003 | B2 | * | 1/2007 | Lozano et al. ................ 714/25 |
| 7,243,270 | B2 | * | 7/2007 | Taniguchi et al. ............. 714/44 |
| 7,286,772 | B2 | * | 10/2007 | Hwang .......................... 399/8 |
| 7,298,508 | B2 | * | 11/2007 | Furukawa et al. .......... 358/1.15 |
| 7,376,725 | B2 | * | 5/2008 | Takahashi et al. ........... 709/223 |

FOREIGN PATENT DOCUMENTS

| | | |
|---|---|---|
| JP | 4-023660 A | 1/1992 |
| JP | 5-004415 A | 1/1993 |
| JP | 7-266581 A | 10/1995 |
| JP | 2002-271555 A | 9/2002 |
| JP | 2003-122279 A | 4/2003 |

* cited by examiner

*Primary Examiner*—David Y Eng
(74) *Attorney, Agent, or Firm*—Rossi, Kimms & McDowell, LLP

(57) ABSTRACT

An image forming apparatus which allows setup to be performed while displaying setup procedure data on a network without causing an adverse effect. The image forming apparatus is capable of accessing a predetermined server via a network. A controller 150 inhibits operations of mechanical movable members of the image forming apparatus. The controller 150 obtains procedure data for setting up the image forming apparatus from the server while the operations of the mechanical movable members of the image forming apparatus are inhibited by the controller 150.

8 Claims, 3 Drawing Sheets

IMAGE FORMING APPARATUS, SETUP METHOD THEREFOR AND PROGRAM FOR IMPLEMENTING THE METHOD

CROSS REFERENCE TO RELATED APPLICATION

This application claims priority from Japanese Patent Application No. 2004-131836 filed Apr. 27, 2004, which is hereby incorporated by reference herein.

BACKGROUND OF THE INVENTION

1. Field of the Invention

The present invention relates to an image forming apparatus such as a multi-function printer (hereinafter, called a multi-function peripheral), a setup method therefor, and a program for implementing the method.

2. Description of the Related Art

Conventionally, when setting up a scanner section and a printer section of a multi-function peripheral as an image forming apparatus, a service man performs the setup while looking at a voluminous procedure manual as printed matter. Namely, the service man needs to carry the voluminous procedure manual, when visiting a purchaser of the multi-function peripheral to perform setup, which is inconvenient. The content and procedure of setup sometimes vary with the model (model number) of the multi-function peripheral, and wrong setup is sometime performed using a procedure manual for a different model. Further, when setup is actually performed, a setup operation needs to be performed while turning the pages of the voluminous procedure manual and attaching tags to the procedure manual as needed, and thus a great deal of labor is required.

Meanwhile, an image forming apparatus such as a multi-function peripheral which has installed therein browsing software for browsing various kinds of data on a network has been realized (for example, see Japanese Laid-Open Patent Publication (Kokai) No. 2003-122279). Thus, to solve the above described problem, it can be envisaged to perform setup of a multi-function peripheral while viewing setup procedure data on the network by browsing software.

However, when power of the multi-function peripheral is turned on for viewing the setup procedure data by browsing software, mechanical moving members of the printer section and the scanner section which are fixed in position by screws or the like when the multi-function peripheral is shipped from the factory operate, leading to failure of the multi-function peripheral. Therefore, power cannot be turned on, and the setup procedure-data cannot be viewed by the browsing software after all.

SUMMARY OF THE INVENTION

It is an object of the present invention to provide an image forming apparatus and a setup method therefor, which allow setup to be performed while displaying setup procedure data on a network without causing unfavorable results, a program for implementing the method.

To attain the above object, in a first aspect of the invention, there is provided an image forming apparatus capable of accessing a predetermined server via a network, and including mechanical movable members, comprising an inhibiting unit that inhibits operations of the mechanical movable members of the image forming apparatus and an obtaining unit that obtains procedure data for setting up the image forming apparatus from the server while the operations of the mechanical movable members of the image forming apparatus is inhibited by the inhibiting unit.

With the image forming apparatus according to the first aspect of the present invention, the procedure data for setting up the image forming apparatus is obtained from the server with the operations of the mechanical movable members of the image forming apparatus inhibited, and therefore the setup can be performed while causing the setup procedure data on the network to be displayed without causing unfavorable results.

Preferably, the image forming apparatus comprises a scanner and a printer, the scanner and the printer having the mechanical moving members, and wherein the inhibiting unit inhibits the operations of the mechanical movable members by continuously shutting off power supply to the scanner section and the printer section.

Preferably, the inhibiting unit inhibits the operations of the mechanical movable members of the image forming apparatus until setup of the image forming apparatus is completed.

Preferably, the obtaining unit comprises browsing software for browsing the procedure data.

More preferably, the browsing software comprises general-purpose browsing software for browsing various kinds of contents on the network.

To attain the above object, in a second aspect of the invention, there is provided a setup method for an image forming apparatus capable of accessing a predetermined server via a network, and including mechanical movable members, comprising an obtaining step of obtaining procedure data for setting up the image forming apparatus from the server while inhibiting operations of the mechanical movable members of the image forming apparatus.

With the setup method according to the second aspect of the invention, the same effect as that of the first aspect can be obtained.

To attain the above object, in a third aspect of the invention, there is provided a computer program product for setting up an image forming apparatus capable of accessing a predetermined server via a network, and including mechanical movable members, comprising an obtaining module for obtaining procedure data for setting up the image forming apparatus from the server while inhibiting operations of the mechanical movable members of the image forming apparatus.

With the computer program product according to the third aspect of the invention, the same effect as that of the first aspect can be obtained.

The above and other objects, features, and advantages of the present invention will become more apparent from the following detailed description taken in conjunction with the accompanying drawings.

DETAILED DESCRIPTION OF THE PREFERRED EMBODIMENTS

Figure 1:
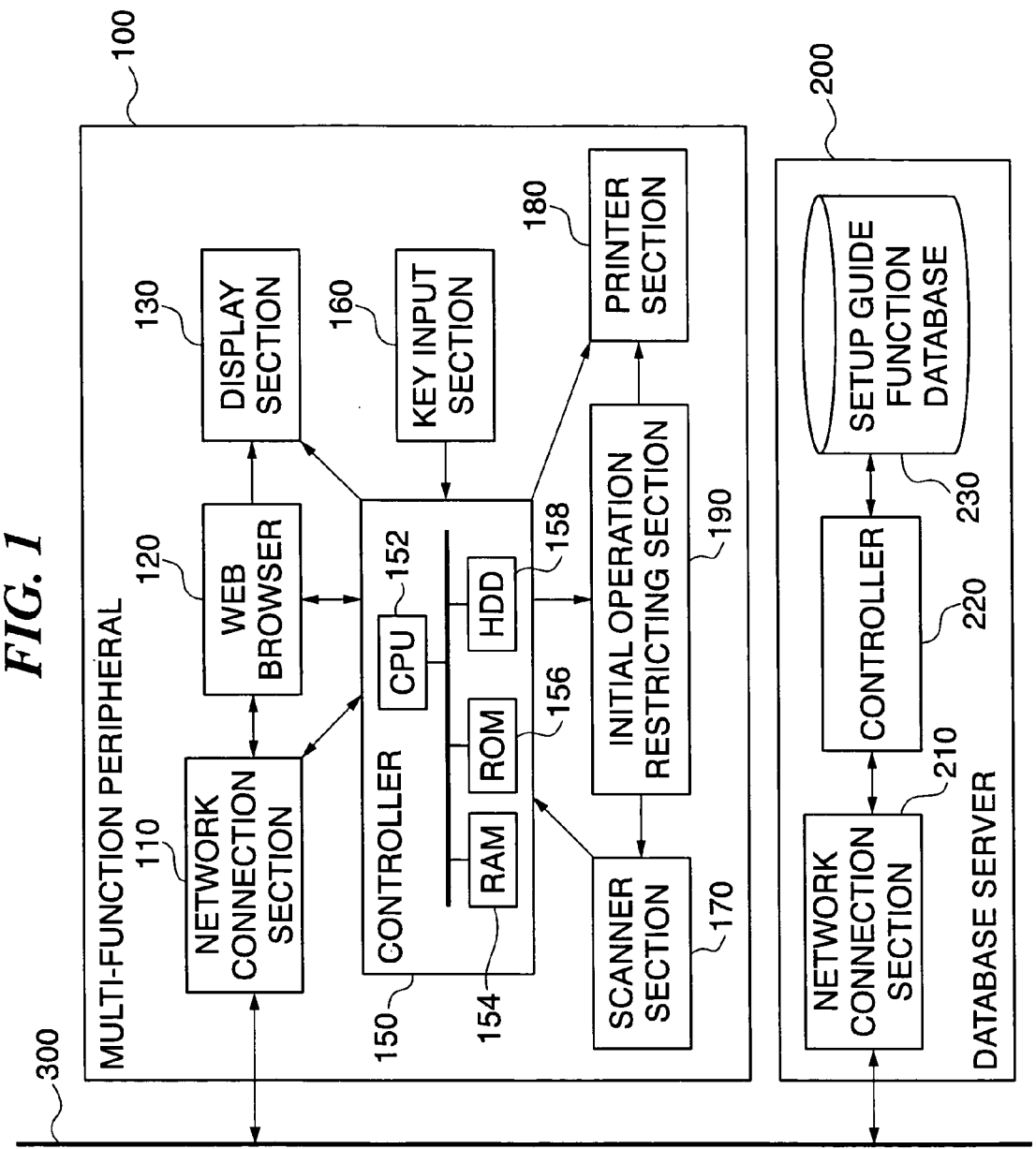
FIG. 1 is a block diagram schematically showing the configuration of a communication system to which an image forming apparatus according to an embodiment of the present invention is applied.

The present invention will now be described in detail with reference to the drawings showing a preferred embodiment thereof. In the drawings, elements and parts which are identical throughout the views are designated by identical reference numerals, and duplicate description thereof is omitted.

Hereinafter, an embodiment of the present invention will be described in detail with reference to the drawings.

FIG. 1 is a block diagram schematically showing the configuration of a communication system to which an image forming apparatus according to the embodiment of the present invention is applied. As shown in FIG. 1, the communication system is comprised of a multi-function peripheral 100 as the image forming apparatus, and a database server 200, and the multi-function peripheral 100 and the database server 200 are connected via a network 300.

The multi-function peripheral 100 is comprised of a network connection section 110, a web browser 120, a display section 130, a controller 150, a key input section 160, a scanner section 170, a printer section 180, and an initial operation restricting section 190.

The network connection section 110 carries out processing for connection to the network 300, and transmits and receives various kinds of data (including commands) to and from other apparatuses on the network 300. The web browser 120 is general-purpose browsing software for browsing various kinds of contents on the network 300, and in the present embodiment, is especially used for obtaining setup data of guiding a setup procedure to be carried out when installing the multi-function peripheral 100 (setup procedure data) on the database server 200 and causing the display section 130 to display the obtained setup guide data so that the obtained setup guide data can be viewed. The data obtained from the web browser 120 and the status of the multi-function peripheral 100 are displayed on the display section 130. The web browser 120 is stored in a hard disk 158 with a system program and the like.

The controller 150 controls the entire operation of the multi-function peripheral 100, performs various kinds of settings of the multi-function peripheral 100, starts predetermined operations, receives scanned data from the scanner section 170 and transmits data to be printed to the printer section 180, in response to commands inputted through the key input section 160.

The controller 150 is comprised of a CPU (Central Processing Unit) 152, a RAM (Random Access Memory) 154, a ROM (Read Only Memory) 156, and a hard disk drive (HDD) 158, and the CPU 152 performs various kinds of control based on programs (including a program corresponding to the flow chart in FIG. 3) stored in the ROM 156. The CPU loads the web browser 120 on the ROM 156 or the hard disk 158 into the RAM 154 when necessary, and accesses the database server 200 by the web browser 120 loaded in the RAM 154. The CPU 152 uses the RAM 154 as a work area.

The key input section 160 is for inputting various kinds of commands and data, and is comprised of a numeric keypad, a touch panel, and the like. The scanner section 170 performs exposure scanning on an image oh an original document and converts the image into electronic image data, and supplies the converted image data to the printer section 180. The printer section 180 prints the electronic image data supplied from the scanner section 170, or electronic image data obtained from other apparatuses on the network 300, on a printing sheet as a visible image.

The initial operation restricting section 190 inhibits or continuously shuts off power supply to the scanner section 170 and the printer section 180 until the initial setting of the multi-function peripheral 100 (the setting up to be carried out when installing the multi-function peripheral 100) is completed. Therefore, the scanner section 170 and the printer section 180 do not operate until the initial setting is completed after shipment from the factory even if power is applied to the multi-function peripheral 100, but the network connection section 110, the web browser 120, the display section 130, the controller 150 and the key input section 160 other than the scanner section 170 and the printer section 180 can be operated by applying power to the multi-function peripheral 100.

Meanwhile, the database server 200 is comprised of a network connection section 210, a database controller 220, and a setup guide function database 230. The network connection section 210 performs processing for connection to the network 300, and transmits and receives various kinds of data (including commands) to and from other apparatuses on the network 300.

The controller 220 analyzes data received via the network connection section 210, determines how to operate based on the analysis result, obtains data on the setup guide function database 230, and transmits the data to the multi-function peripheral 100 via the network connection section 210 and the network 300. Detailed procedure data for performing setup of the multi-function peripheral 100 is registered in the setup guide function database 230. The controller 220 has a HTTP (HyperText Transfer Protocol) server function to enable the web browser 120 of the multi-function peripheral 100 to access the setup procedure data. A plurality of kinds of procedure data for setting up apparatuses such as multi-function peripherals according to various kinds of models (model numbers) are registered in the setup guide function database 230. The database server 200 thus configured makes it possible for the web browser 120 of the multi-function peripheral 100 to refer to the setup procedure data for the multi-function peripheral.

Figure 2:
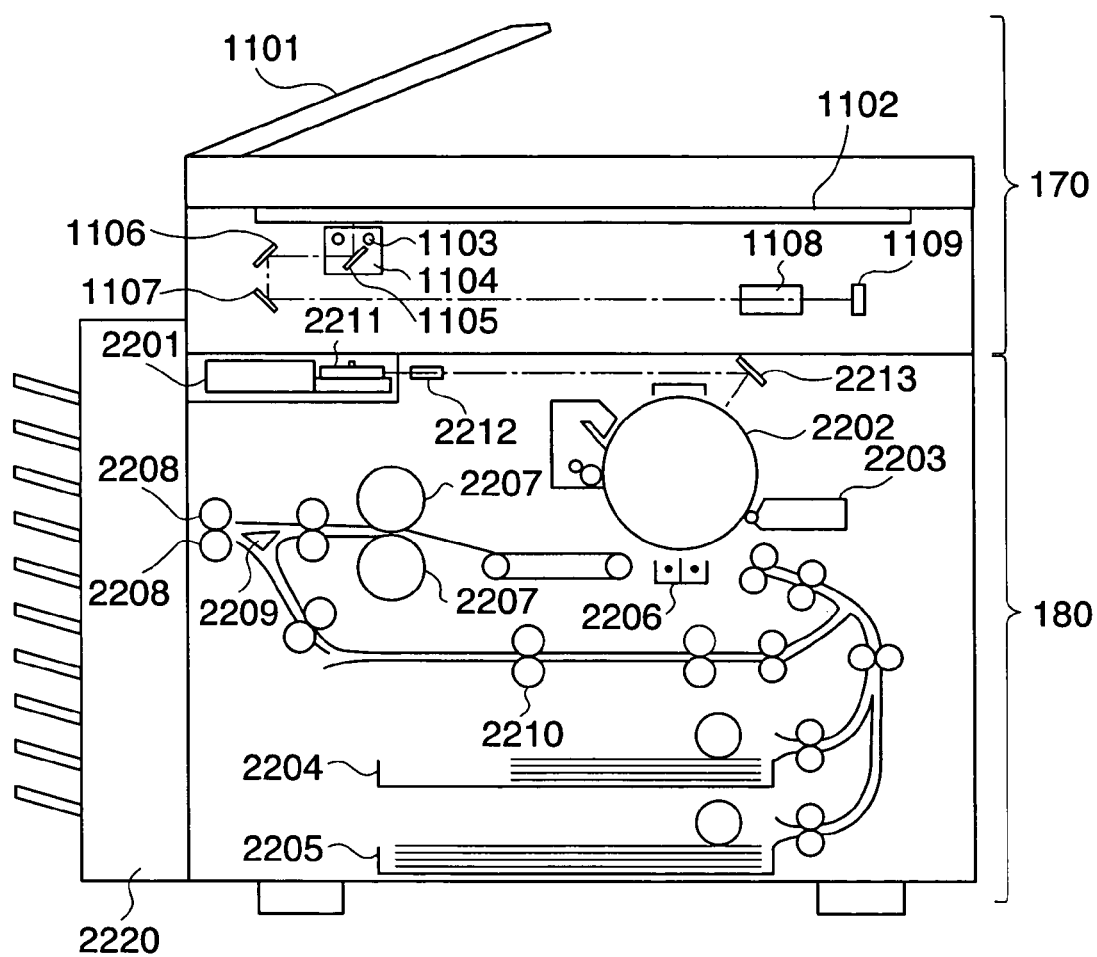
FIG. 2 is a sectional view schematically showing the mechanical construction of a multi-function peripheral as the image forming apparatus.

FIG. 2 is a sectional view schematically showing the mechanical configuration of the multi-function peripheral 100. A document feeder 1101 of the scanner section 170 feeds documents onto a platen glass 1102 one by one from the final page in order, and after finishing a reading operation of the document image, discharges the document on the platen glass 1102. A scanner unit 1104 houses a lamp 1103 and a mirror 1105 and reciprocates in leftward and rightward directions as viewed in FIG. 2 with the lamp 1103 illuminating, whereby exposure scanning is performed on the image of the document on the platen glass 1102.

At this time, reflected light (image light) from the document enters a lens 1108 via the mirrors 1105, 1106 and 1107, and is collected by this lens 1108 and enters an image sensor 1109. The image sensor 1109 performs photoelectric conversion of the incident image light, and outputs an electric image signal. The electric image signal is subjected to predetermined processing such as shading correction and gamma correction, and then the image signal is transferred to the printer section 180 as multivalued image data of multiple tone densities. The mirrors 1106 and 1107 move at a predetermined speed with the movement of the scanner unit 1104.

A laser light emitter 2201 of the printer section 180 emits laser light based on the multivalued image data or the like supplied from the scanner section 170. The laser light emitted from the laser emitter 2201 has its traveling direction deflected by a polygon mirror 2211, and is irradiated onto a photoconductor drum 2202 via a correction lens group 2212 and a mirror 2213. An electrostatic latent image is formed on the photoconductor drum 2202 by the irradiation with the laser light, and the electrostatic latent image is developed as a toner image by a developing device 2203.

On the other hand, a recording sheet is picked up from a cassette 2204 or a cassette 2205 in timing synchronous with the start of the irradiation of the laser light onto the photoconductor drum 2202, and is conveyed to a transfer section 2206, and the toner image on the photoconductor drum 2202 is transferred onto the recording sheet by the transfer section 2206. The recording sheet onto which the toner image has been transferred is conveyed to a fixing section 2207, where the toner image is fixed onto the recording sheet by being heated and pressurized by the fixing part 2207. The recording sheet subjected to the fixing is normally discharged to a sorter 2220 by a discharge roller 2208, and the sorter 2220 sorts discharged recording sheets by storing the discharged recording sheets into respective bins. In the case of double-sided recording or multiple recording, the recording sheet is guided to a re-feed sheet conveying path having conveying rollers 2209 and 2210 by a flapper 2209 being lifted upward in predetermined timing.

At the time of shipment of the multi-function peripheral 100 from the factory, mechanical movable parts (mechanical movable members) such as the scanner unit 1104 and the mirrors 1106 and 1107 of the scanner section 170, and the photoconductor drum 2202 of the printer section 180 are fixed in position by screws or the like for preventing them from moving during transportation, and to operate the multi-function peripheral 100 properly without causing unfavorable results such as failure of the multi-function peripheral 100, it is necessary to release fixation of these mechanical movable parts as part of the setup.

Figure 3:
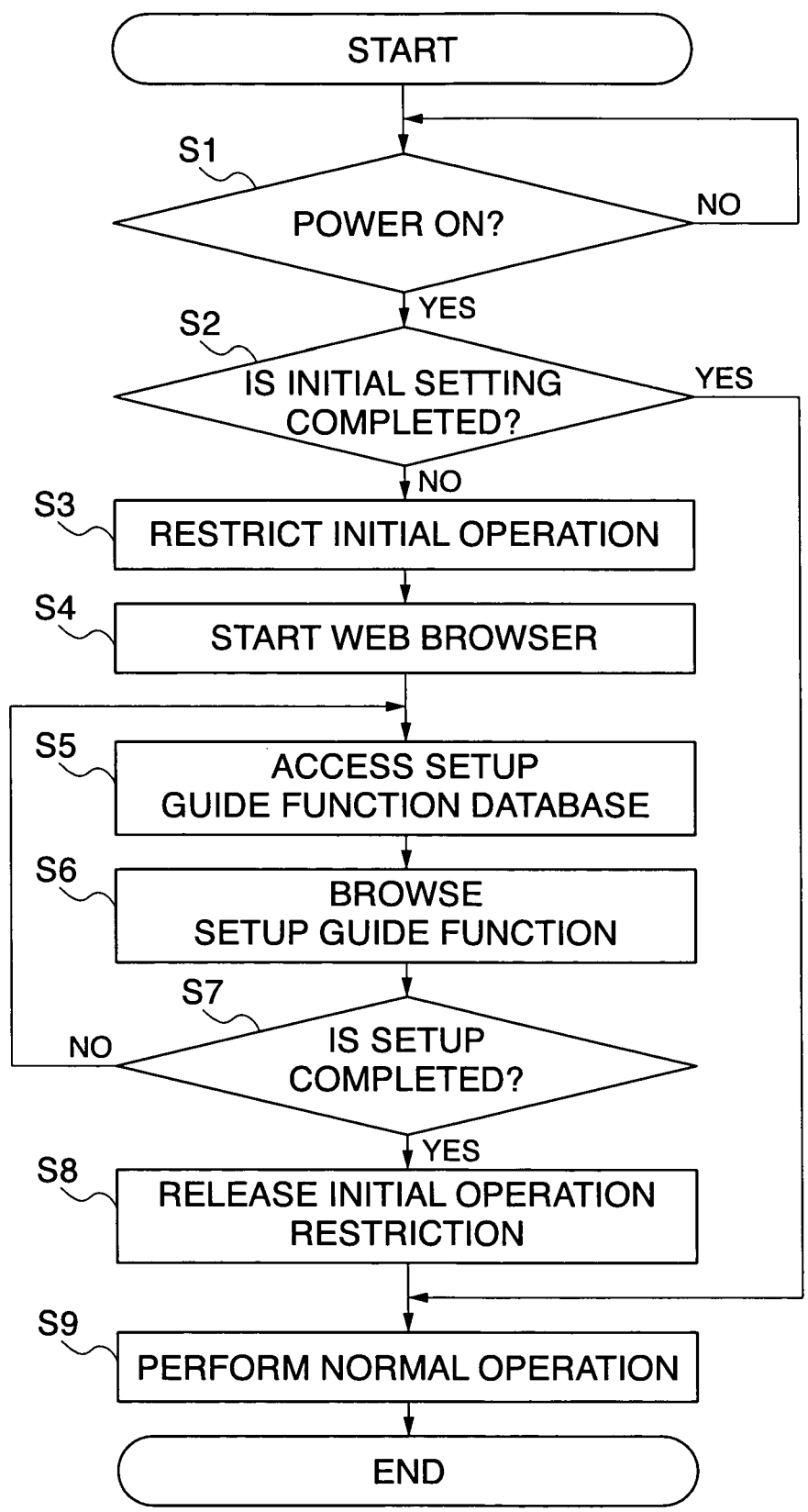
FIG. 3 is a flow chart showing the procedure of a setup process of the multi-function peripheral as the image forming apparatus.

Next, the setup process of the multi-function peripheral 100 will be described with reference to the flow chart in FIG. 3.

When the power is turned on (YES to a step S1), the controller 150 of the multi-function peripheral 100 determines whether an initial setting flag is set to "1" or not, to thereby determine whether the initial setting of the multi-function peripheral 100 is completed or not (step S2). When the initial setting flag initial setting flag is set to "1", and hence the initial setting of the multi-function peripheral 100 is completed, the process proceeds to a step S9 where the controller 150 performs an ordinary operation and the process is terminated. At the time of shipment of the multi-function peripheral 100 from the factory, the initial setting flag is set to "0", which shows incompletion of the initial setting.

The initial setting flag may be stored in a predetermined nonvolatile memory such as the hard disk drive 158 of the multi-function peripheral 100.

When the initial setting flag is set to "0" and hence the initial setting of the multi-function peripheral 100 is not completed (NO to the step S2), the controller 150 causes the initial operation restricting section 190 to inhibit power supply to the scanner section 170 and the printer section 180 to restrict the initial operations of the scanner section 170 and the printer section 180 (step S3).

Next, the controller 150 starts up the web browser 120 (step S4), and causes the web browser 120 to access the setup guide function database 230 on the database server 200 (step S5), and causes the display section 130 to display the setup procedure data for the multi-function peripheral 100 on the setup guide function database 230, namely, the setup procedure data corresponding to the model number of the multi-function peripheral 100 (step S6). The service man performs the setup of the multi-function peripheral 100 such as releasing fixation of the movable parts in the fixed state, such as the scanner unit 1104, the mirrors 1106 and 1107 and the photoconductor drum 2202 in accordance with the displayed setup procedure.

When obtaining the setup procedure data for the multi-function peripheral 100 by the web browser 120, the controller 150 gives URL relating to the setup procedure data corresponding to the model (model number) of the multi-function peripheral 100 to the web browser 120. In this case, the above URL may be previously incorporated in the program corresponding to this flow chart, or may be previously stored in a predetermined nonvolatile memory such as the hard disk drive 158 in the controller 150 of the multi-function peripheral 100.

To access the setup guide function database 230 by using the web browser 120, it is necessary to connect in advance the multi-function peripheral 100 to a network cable for connection to the network and perform settings (for example, settings of the IP address) for connection to the network. When necessary preparations for the web browsing have not been made, the web browser 120 cannot access the setup guide function database 230 in the step S5. In such a case, the web browser 120 may display an error message "The network connection cannot be established. Connect the network cable and perform network settings". Data for displaying such an error message is previously stored in a predetermined nonvolatile memory such as the hard disk drive 158 in the controller 150 as, for example, a HTML (HyperText Markup Language) file. When the web browser 120 cannot access the setup guide function database 230, it can display the error message by accessing the HTML file for displaying the error message.

The error message displayed here may not only display the fact of incapability of connecting to the network but also display an explanation of the operation and setting method for enabling connection to the network.

Next, the controller 150 determines whether a setup completion signal based on an operation of the key input section 160 has been inputted or not (step S7), and when the setup completion signal has not been inputted, the process returns to the step S5, where the controller 150 causes the web browser 120 to access the next setup procedure data for the multi-function peripheral 100 on the setup guide function database 230 in accordance with a page updating operation by the service man and causes the display section 130 to display the next setup procedure data, so that the service man can continue the setup operation.

On the other hand, when the setup completion signal has been inputted, the controller 150 causes the initial operation restricting section 190 to release the inhibition of the power supply to the scanner section 170 and the printer section 180, to thereby release the initial operation restriction of the scanner section 170 and the printer section 180 (step S8). Then, the controller 150 performs an ordinary operation (step S9), and then the process is terminated.

As described above, according to the present embodiment, the power supply to the scanner section 170 and the printer section 180 is inhibited until the setup of the multi-function peripheral 100 is completed, whereby the operations of the scanner unit 1104, the mirrors 1106 and 1107, the photoconductor drum 2202, and the like which are mechanical moving parts are inhibited, and in this inhibited state, the setup procedure data for the multi-function peripheral 100 is obtained from the database server 200 on the network 300 by the web browser 120.

As a result, when setting up the multi-function peripheral 100 while viewing the setup procedure data obtained from the database 200 on the network 300, the scanner unit 1104, the mirrors 1106 and 1107, the photoconductor drum 2202, and the like in the fixed state do not operate, and therefore, it is made possible to set up the multi-function peripheral 100 without causing unfavorable results such as failure of the multi-function peripheral 100. Moreover, the service man does not need to carry a voluminous procedure manual for setup to a purchaser of the multi-function peripheral 100. It can be also avoided that wrong setup is made in accordance with the procedure manual for a different model. Further, it is not necessary for the service man to perform a setup operation while turning the pages of the voluminous procedure manual and attaching tags to the procedure manual as needed, to thereby make it possible to reduce time and effort for the setup operation.

The present invention is not limited to the above-described embodiment, and alternatively, it is possible to release inhibition of the operations of the mechanical movable parts at the point of time when the setup of all the mechanical movable parts (removal of the screws for fixation and the like) is completed, instead of inhibiting the operations of the mechanical movable parts until the setup of the multi-function peripheral 100 is completed. As the browsing software, it is also possible to use dedicated browsing software exclusively used for browsing the setup procedure data instead of the general-purpose web browser 120 for browsing various kinds of contents.

It is to be understood that the object of the present invention may be also accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code. When the present invention is applied to the above described storage medium, the program code corresponding to the flow chart described above (shown in FIG. 3) is stored in the storage medium.

What is claimed is:

1. An image forming apparatus capable of accessing a predetermined server via a network, comprising:
   a mechanical movable member that is fixed to the image forming apparatus until a setup of image forming apparatus is completed by releasing the mechanical movable member from being fixed to the image forming apparatus;
   a determining unit that determines whether or not the setup of the image forming apparatus is not completed;
   an inhibiting unit that electrically inhibits operations of the mechanical movable member of the image forming apparatus when said determining unit determines that setup of the image forming apparatus is not completed; and
   an obtaining unit that obtains procedure data representing a procedure for the setup of the image forming apparatus from the server while the operations of the mechanical movable member of the image forming apparatus are inhibited by said inhibiting unit; and
   a display unit that displays the procedure data obtained by the obtaining unit; and
   a releasing unit that deactivates the inhibiting unit when the setup is completed so as to allow the mechanical movable member to move.

2. The image forming apparatus as claimed in claim 1, further comprising a scanner section and a printer section, said scanner and said printer each comprising the mechanical moving member, wherein said inhibiting unit continuously shuts off power supply to said scanner section and said printer section to inhibit the operations of said scanner section and said printer section.

3. The image forming apparatus as claimed in claim 1, wherein said obtaining unit includes browsing software for browsing the procedure data.

4. The image forming apparatus as claimed in claim 3, wherein said browsing software comprises general-purpose browsing software for browsing various kinds of contents on the network.

5. A setup method for an image forming apparatus capable of accessing a predetermined server via a network, and including a mechanical movable member that is fixed to the image forming apparatus until a setup of image forming apparatus is completed by releasing the mechanical movable member from being fixed to the image forming apparatus, the method comprising:
   a determining step that determines whether or not setup of the image forming apparatus is not completed with a determining unit of the image forming apparatus;
   an inhibiting step of electrically inhibiting operations of the mechanical movable member of the image forming apparatus, with an inhibiting unit of the image forming apparatus, when said determining step determines that the setup of the image forming apparatus is not completed;
   an obtaining step of obtaining procedure data representing a procedure for the setup of the image forming apparatus from the server while inhibiting the operations of the mechanical movable member of the image forming apparatus;
   a displaying step of displaying the procedure data obtained in the obtaining step in a display unit; and
   a releasing step of releasing the inhibiting operations of the mechanical movable member after completing the setup of the image forming apparatus to enable a normal operation of the image forming apparatus.

6. A computer-readable medium storing a computer program for setting up an image forming apparatus capable of accessing a predetermined server via a network, and including mechanical movable member, that is fixed to the image forming apparatus until a setup of image forming apparatus is completed by releasing the mechanical movable member from being fixed to the image forming apparatus, the computer program executable by a processor to carry out the following instructions:

determining whether or not setup of the image forming apparatus is not completed;

electrically inhibiting operations of the mechanical movable member of the image forming apparatus when the determining instruction determines that the setup of the image forming apparatus is not completed;

obtaining procedure data representing a procedure for the setup of the image forming apparatus from the server while inhibiting the operations of the mechanical movable member of the image forming apparatus;

displaying the procedure obtained in the obtaining instruction in a display unit; and releasing the inhibiting operations of the mechanical movable member after completing the set up of the image forming apparatus to enable a normal operation of the image forming apparatus.

7. The method as claimed in claim 5, wherein the image forming apparatus includes a scanner section and a printer section each comprising the mechanical moving member, wherein the inhibiting step includes continuously shutting off power supply to the scanner and printer sections to inhibit the operations of said scanner section and said printer section.

8. The computer-readable medium as claimed in claim 6, wherein the image forming apparatus includes a scanner section and a printer section each comprising the mechanical moving member, wherein the inhibiting instruction is configured to continuously shut off power supply to the scanner and printer sections to inhibit the operations of said scanner section and said printer section.

* * * * *